March 15, 1938.  K. ZÄNGL  2,111,233
DEVICE FOR VULCANIZING PNEUMATIC TIRES
Filed June 2, 1936  2 Sheets-Sheet 2
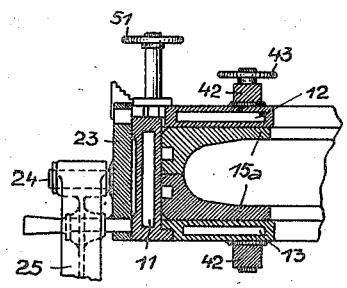
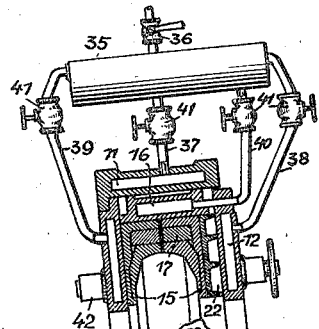
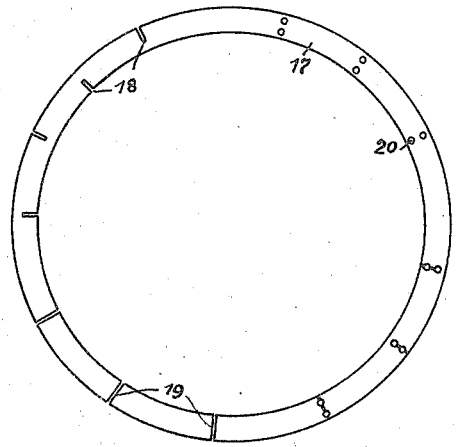
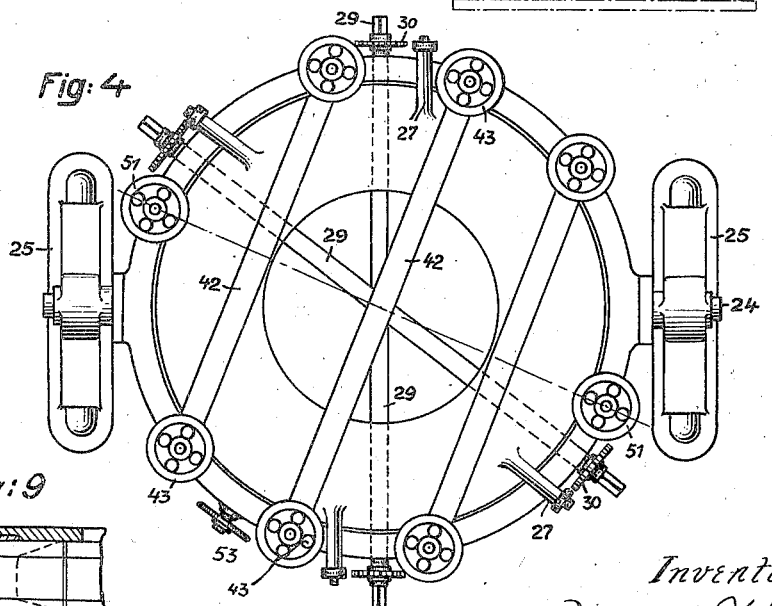
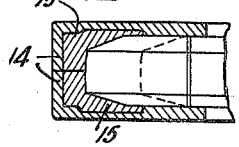
Inventor:
Karl Zängl Patented Mar. 15, 1938

2,111,233

UNITED STATES PATENT OFFICE 2,111,233

DEVICE FOR VULCANIZING PNEUMATIC TIRES

Karl Zängl, Munich, Germany

Application June 2, 1936, Serial No. 83,107
In Germany October 13, 1934

3 Claims. (Cl. 18—38)

This invention relates to a mould for vulcanizing renovated pneumatic tires, and its object is to obtain a simple arrangement whereby tires of different sizes can be readily dealt with and whereby the heating can be regulated strictly in accordance with requirements.

With this object in view the invention consists essentially in the provision of a mould comprising concentric, cylindrical heating jackets, and means allowing the outer jacket to be used either with or without the inner jacket or jackets according to the size of the tire.

Fillers are provided to suit different kinds of tires and these fillers are made so as to allow of being easily assembled and so that the heat will be uniformly distributed over the renovated parts of the tires.

Figure 1:
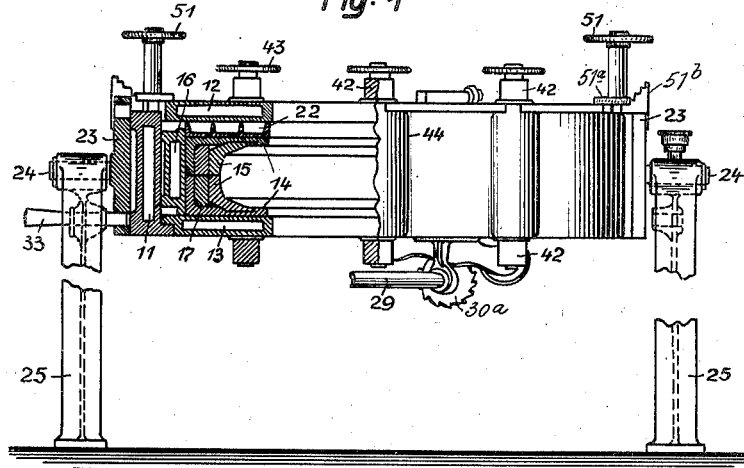
Figure 2:
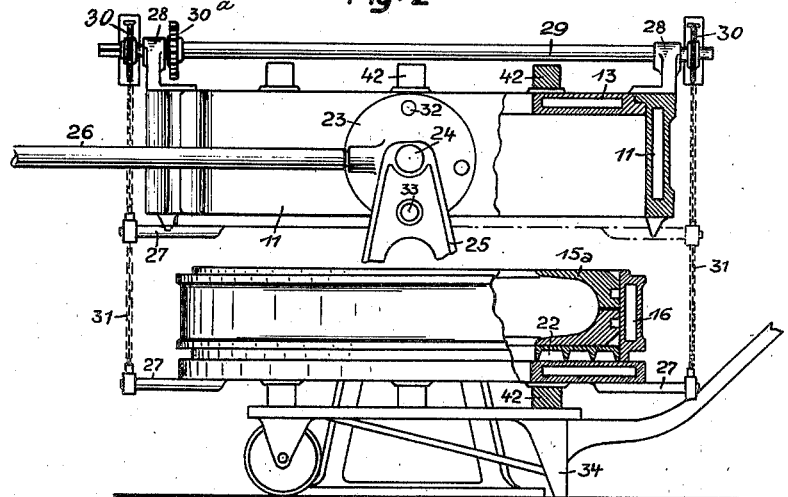

Fig. 1 of the accompanying drawings represents a side view partly in section of a mould constructed according to the invention, Fig. 2 is a view at right angles to Fig. 1 and shows the mould in course of being assembled, Fig. 3 is a view showing the mould in position of use, Fig. 4 is a plan view of the mould, and Figs. 5–9 are views of various details of the mould.

Figure 5:
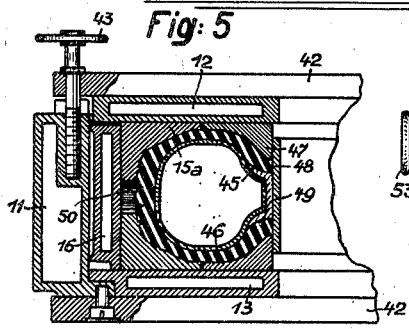

The mould illustrated in the drawings comprises a pair of hollow, cylindrical, concentric heating jackets 11 and 16 and two flat, hollow heating rings 12 and 13 which are clamped to the jackets and form the side members of the mould. The inner jacket 16 is an auxiliary one and is only used in conjunction with the outer, principal jacket 11 for small sizes of tires. For the accommodation of still smaller sizes of tires, a shell 14 is provided which fits inside the jacket 16 and is composed of two coaxial, flanged rings. Inside this shell there is a ring 17 which is divided, like the shells, into two coaxial parts. In addition to these fillers there are the usual segments 15a and 47 which bear against the tread and sides of the tire and are shaped in conformity therewith. To allow for different thicknesses of tires the mould is adapted to accommodate annular fillers 22 arranged against the heating rings 12, 13 and a ring, or assembly of rings 50 adapted to be arranged between the segments 15a, as shown in Fig. 5. The inner surface 48 of the tire is supported by a cylindrical ring 49 which closes the mould. All the parts, with the exception of the ring or rings 17, are made of heavy metal of substantially the same co-efficient of expansion, for example iron. The ring or rings 17 are made of light metal, and in order to allow for the greater expansion thereof as compared with the iron, the rings are either provided with staggered radial slits 18 (Fig. 8) or apertures 20, or they are cut through as shown at 19 to form segments.

Figure 6:
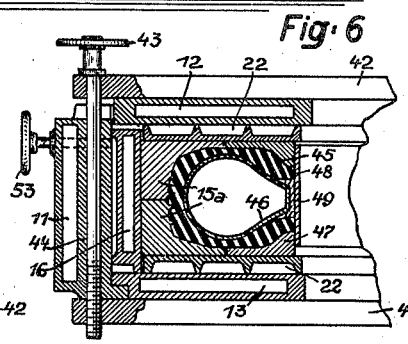

By the employment or not of the jacket 16 and more or less of the fillers, a great variety of tires can be vulcanized in the same mould. Fig. 1 shows a normal, small tire for which the jacket 16 and all the fillers, with the exception of one of the rings 22, are employed. Fig. 5 shows an arrangement used for a large balloon tire, the jacket 16 being omitted and the segments 15a being separated by a ring 50. In Fig. 6 a large but narrower tire is arranged for vulcanization without the jacket 16 but with rings 22 between the segments and the heating rings 12 and 13. Fig. 7 shows a modified form of segments 15a used in direct contact with the jacket 11 and with the heating rings 12 and 13. Fig. 9 shows the shell 14 in use without the rings 17.

The elements are clamped together by means of reinforcement bars 42 arranged across the heating rings 12 and 13. The clamp screws are operated by means of hand wheels 43 and they are either passed through eyelets 44 in the jacket 11, as shown in Fig. 6, for connection to opposite bars, or screwed into sockets in the jacket, as shown in Fig. 5. For the initial fastening of the upper heating ring 12, there are two clamp screws 51 which bear by means of clamping plates 51a against the ring and against stepped brackets 51b attached to the jacket 11.

The mould is supported between uprights 25 by pivots 24 connected by means of plates or discs 23 in diametrically opposite positions to the jacket 11. A lever arm 26, secured to the disc 23, can be used for turning the mould about the pivots, and a bolt passed through an aperture 33, in one of the uprights and through apertures 32 in the adjacent disc, will secure the mould in different positions. Fig. 3 shows the mould in the inclined position required for the vulcanizing process. A steam distributing vessel 35 is connected through a valve 36 with a steam generator, and through flexible pipes 37, 38, 39 and 40 with the jacket 11, with the rings 12 and 13 and with the jacket 16 respectively. Each pipe is fitted with a valve 41 for regulating the steam supply and thus the heating according to the nature of the tire and of the particular renovation thereof. The condensate flows through pipes 37a, 38a, 39a and 40a into a collecting vessel 35a whence it is discharged at 52. These pipes are fitted with valves 41a.

For the convenient manipulation of the heavy mould elements, a hoisting device is provided which consists of shaft 29 arranged diametrically across the heating ring 13 and mounted in bearings 28. Sprocket wheels 30, mounted on the shafts, carry chains 31 which are detachably connected at one end to arms 27 connected to and projecting radially from the heating ring 12. This arrangement allows, when the mould is turned into the position 2, the ring 12 to be conveniently lowered on to a truck 34 or the like. Ratchet wheels 30a on the shafts 29 are used in co-operation with detent pawls, in known manner, for arresting the movement of the shafts. With the ring 12 separated from the jacket and resting on the truck 34, it can be moved clear of the mould structure for a convenient assembling of the fillers around the tire 45. The latter, with its inflating tube 46 in position, is embedded between the mould segments 15a and 47, and the ring 49 and the various fillers including the jacket 16, if required, are placed in position. Thereupon the assembled elements are moved by means of a truck into position under the jacket 11, the chains 31 are attached to the arm 27, the elements are raised by means of a hoisting device into the jacket 11, and the clamp screws are applied in order to complete the mould. The jacket 16, if employed, may be positioned relative to the jacket 11 by means of a clamp screw 53. After the removal of the chains and the truck 34, the mould can be turned into position for the reception of the flexible pipe connections and for carrying out the vulcanization.

After the completion of the vulcanization, the mould is again turned into the position shown in Fig. 2 for the removal of the tire and the fillers from the jacket 11. This is easily effected since the elements are heavy and will lead the jacket by gravity together with the tire.

I claim:

1. A mould for vulcanizing renovated pneumatic tires, comprising cylindrical, concentric, separable heating jackets, hollow heating rings applied to said jackets as side members for the mould, means for heating said jackets and rings independently of one another, fillers for packing the tire within the mould, said fillers comprising a pair of flanged rings forming together a U-shaped shell, the latter, together with the other fillers and rings and jackets being made of heavy metal, and rings of light metal arranged within said shell.

2. A mould as claimed in claim 1 wherein the rings of light metal are notched to allow for expansion.

3. A mould as claimed in claim 1 wherein the rings of light metal are divided into segments adapted to allow for expansion.

KARL ZÄNGL.